3,388,159
NOVEL SULFONYLCARBODIIMIDES AND PROCESS

Adnan A. R. Sayigh, North Haven, and Henri Ulrich, Northford, Conn., and John B. Wright, Kalamazoo, Mich., assignors to The Upjohn Company, Kalamazoo, Mich., a corporation of Delaware
No Drawing. Filed Jan. 2, 1964, Ser. No. 335,414
5 Claims. (Cl. 260—556)

The present invention relates to novel compounds, compositions, and to a novel process, and more particularly relates to novel sulfonylcarbodiimides and to unit dosage compositions containing sulfonylcarbodiimides and to a novel process for the preparation of sulfonylcarbodiimides.

The novel sulfonylcarbodiimides of the present invention possess the following formula:

$$R^1-SO_2-N=C=N-R$$
I wherein $R^1$ represents alkyl of one to six carbon atoms, inclusive, e.g., methyl, ethyl, propyl, butyl, isobutyl, pentyl, hexyl, and the like, and

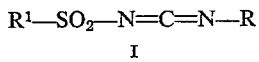

wherein X and $X_1$ represent hydrogen, alkyl of one to four carbon atoms, inclusive, e.g., methyl, ethyl, propyl, isopropyl, butyl, isobutyl, and the like, alkoxy of one to four carbon atoms, inclusive, e.g., methoxy, ethoxy, propoxy, isopropoxy, butoxy, and the like, halogen, e.g., chloro, bromo, fluoro, and the like, and alkanoyl of two to four carbon atoms, inclusive, e.g., acetyl, propionyl, butyryl, and the like. X and $X_1$ can be alike or different. R represents alkyl of one to six carbon atoms, inclusive, e.g., methyl, ethyl, propyl, isopropyl, isobutyl, butyl, hexyl, and the like, cycloalkyl of five to eight carbon atoms, inclusive, e.g., cyclopentyl, cyclohexyl, cycloheptyl, cyclooctyl, and the like, and

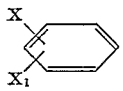

which represents a saturated heterocyclic amino selected from the group consisting of unsubstituted and mono- and polyalkyl substituted piperidino and hexamethyleneimino wherein each alkyl is of one to four carbon atoms, inclusive. Representative saturated heterocyclic amino radicals include, e.g., piperidino, hexamethyleneimino, 2-methylpiperidino, 3-methylpiperidino, 4-methylpiperidino, 2-butylpiperidino, 2-propylpiperidino, 4-isopropylpiperidino, 3,4-diethylpiperidino, and the like.

The sulfonylcarbodiimides of this invention can be prepared by a novel two-stage reaction of substantially equal molecular amounts of a sulfonylthiourea of the formula:

$$R^1-SO_2-NH-\overset{S}{\overset{\|}{C}}-NH-R$$
II wherein $R^1$ and R are as defined above and an acid halide, e.g., phosgene, phosphorous pentachloride, phosphorus pentabromide, phosphorus trichloride, phosphorus tribromide, thionyl chloride, and the like, the acid chloride being preferred. The two reactants are mixed, preferably in the presence of an inert solvent, under substantially anhydrous conditions, in the presence or absence of an acid acceptor, and within the range of between 0° and about 60° C., preferably between about 15° and about 50° C., and then the reaction mixture is heated within the range of between about 75° and about 200° C., preferably between about 75° and about 150° C.

In carrying out the novel process of the invention, it is not essential that the initial reaction mixture or the subsequent first-stage or second-stage reaction mixtures be maintained completely free of all moisture. For example, access of the reaction mixture to the moisture normally present in the atmosphere will not cause a substantial decrease in the amount of sulfonylcarbodiimide ultimately produced. It is desirable, however, to use reactants, reaction solvents, and reaction vessels which are substantially free of water. For example, it is desirable that no more than 0.01 mole of water per mole of acid halide be present in a reaction mixture. Preferably, less water should be present. The presence of more water will decrease the yield of the desired sulfonylcarbodiimide by reacting with the sulfonylcarbodiimide. The reaction as noted above can be carried out in the presence or absence of an acid acceptor. In the event that an acid acceptor is employed, it is preferable to utilize a tertiary amine acid acceptor, e.g., triethylamine. Practically any quantity of acid acceptor can be added without adversely affecting the yield but, preferably, it is advisable to employ one mole or less per mole of liberated acid.

Although the presence of a reaction solvent is not essential, particularly if the thiourea of Formula II is a liquid at the first-stage reaction temperature, it is usually advantageous to dissolve or suspend the sulfonylthiourea reactant in an inert solvent, and then to add a solution of acid halide in the same or similarly inert solvent. Alternatively, a solvent can be used to dissolve or disperse the thiourea, and the desired amount of acid halide can then be added in gaseous form. Suitable solvents are aromatic hydrocarbons, e.g., benzene, toluene, xylene; aliphatic hydrocarbons, e.g., hexane, heptane, octane, mineral oil; cycloalkanes, e.g., cyclohexane, tetrahydronaphthalene, decalin; chlorinated hydrocarbons, e.g., chlorobenzene, ethylene dichloride and carbon tetrachloride; dialkyl ethers of ethylene glycol and diethylene glycol, e.g., the dimethyl ethers; dialkyl sulfoxides, e.g., dimethyl sulfoxide, and the like. Especially preferred as reaction solvents are the normally fluid aromatic hydrocarbons and chlorinated hydrocarbons. Important criteria in the choice of a reaction solvent are that the solvent be a liquid over the entire desired reaction temperature range and that the solvent not react with the acid halide or with the desired sulfonylcarbodiimide. In general, solvents should be avoided which contain active hydrogen atoms as determined by the Zerewitinoff procedure [J. Amer. Chem. Soc. 49, 3181 (1927)]. The amount of solvent to be used is not critical, it being desirable, however, that a reasonably fluid reaction mixture be maintained to facilitate contact between the acid halide and the sulfonylthiourea.

It is preferred to react substantially equal molecular amounts of the acid halide and thiourea. Lesser or greater amounts of acid halide will result in smaller yield of the desired sulfonylcarbodiimide. When lesser amounts of acid halide are used, some of the sulfonylthiourea remains unreacted.

The time required for completion of the first and second stages of the novel reaction of this invention vary according to the nature of the sulfonylthiourea reactant. Satisfactory results are unually obtained by a slow mixing of acid halide and the thiourea, for example, during about 20 to about 120 minutes within the relatively low first-stage temperature range. Although the first-stage reaction usually proceeds to completion rapidly, it is desirable to maintain the reaction mixture within the first-stage temperature range for about 5 minutes to about 6 hours before starting the second stage of the reaction. The second stage usually requires heating within the higher temperature range for about 1 to 6 hours.

The second stage can also, if desired, be conducted in the presence of an inert gas, for example, passing nitrogen or helium through the reaction mixture in order to remove undesired reaction products.

The isolation of a sulfonylcarbodiimide from a second-stage reaction mixture can be carried out by conventional techniques, for example, by evaporation of the reaction solvent and distillation of the residue at reduced pressure. Alternatively, the sulfonylcarbodiimide can be isolated from said residue by chromatography. If the sulfonylcarbodiimide is normally a solid, it can be isolated and purified by crystallization from a suitable solvent or pair of solvents.

The starting sulfonylthioureas can be prepared according to the procedures outlined in Chem. Rev. 50, 1–46, 1952, and Ber. 83, 551, 1950. For example, the starting sulfonylthioureas can be prepared by reacting sulfonamides in aqueous sodium hydroxide with a substituted isothiocyanate.

The following preparations are illustrative of the process and products of the present invention, but are not to be construed as limiting.

EXAMPLE 1

*N-benzenesulfonyl-N'-ethylcarbodiimide*

To 9.76 g. (0.04 mole) of N-benzenesulfonyl-N'-ethylthiourea in 60 ml. of dry chlorobenzene was added 4 g. (0.04 mole) of phosgene in 40 ml. of dry chlorobenzene dropwise with cooling and stirring over a period of 14 minutes at 5° C. After stirring for 90 minutes at 25° C., the reaction was heated at 132° C. for 50 minutes while nitrogen was passed through the reaction mixture. A small amount of solid material was removed by filtration and upon evaporation of the chlorobenzene 7.8 g. of crude product was obtained. Distillation under reduced pressure produced 4 g. (47.6 percent) of N-benzenesulfonyl-N'-ethylcarbodiimide, B.P. 139–144° C. (0.2 mm.).

*Analysis.*—Calcd. for $C_9H_{10}N_2O_2S$: C, 51.41; H, 4.79; N, 13.32; Found: C, 51.37; H, 4.80; N, 13.11.

In the same manner as shown above,

N-benzenesulfonyl-N'-methylcarbodiimide,
N-benzenesulfonyl-N'-propylcarbodiimide,
N-benzenesulfonyl-N'-isopropylcarbodiimide,
N-benzenesulfonyl-N'-isobutylcarbodiimide,
N-benzenesulfonyl-N'-pentylcarbodiimide,
N-benzenesulfonyl-N'-isopentylcarbodiimide, and
N-benzenesulfonyl-N'-hexylcarbodiimide are prepared by substituting N-benzenesulfonyl-N'-methylthiourea,
N-benzenesulfonyl-N'-propylthiourea,
N-benzenesulfonyl-N'-isopropylthiourea,
N-benzenesulfonyl-N'-isobutylthiourea,
N-benzenesulfonyl-N'-pentylthiourea,
N-benzenesulfonyl-N'-isopentylthiourea, and
N-benzenesulfonyl-N'-hexylthiourea, respectively, for N-benzenesulfonyl-N'-ethylthiourea.

EXAMPLE 2

*N-(4-methylbenzenesulfonyl)-N'-ethylcarbodiimide*

To 7.74 g. (0.03 mole) of N-(4-methylbenzenesulfonyl)-N'-ethylthiourea in 50 ml. of dry chlorobenzene was added 3 g. (0.03 mole) of phosgene in 30 ml. of dry chlorobenzene dropwise with stirring and cooling over a period of 11 minutes at 3–4° C. After stirring for one hour at temperatures between 25–28° C., the reaction mixture was refluxed for 40 minutes with nitrogen passing through the reaction mixture. Evaporation of the chlorobenzene gave 6.6 g. of crude product which upon distillation under reduced pressure produced (40.2 percent) of N - (4-methylbenzenesulfonyl)-N'-ethylcarbodiimide, B.P. 147–151° C. (0.25 mm.).

*Analysis.*—Calcd. for $C_{10}H_{12}N_2O_2S$: C, 53.55; H, 5.39; N, 12.49; S, 14.30. Found: C, 53.56; H, 5.26; N, 12.62; S, 14.42.

In the same manner as shown above, N-(4-ethylbenzenesulfonyl) - N' - ethylcarbodiimide, N-(3-propylbenzenesulfonyl) - N' - ethylcarbodiimide, and N-(4-butylbenzenesulfonyl) - N' - ethylcarbodiimide are prepared by substituting N - (4 - ethylbenzenesulfonyl)-N'-ethylthiourea, N-(3-propylbenzenesulfonyl)-N'-ethylthiourea, and N - (4 - butylbenzenesulfonyl)-N'-ethylthiourea, respectively, for N-(4-methylbenzenesulfonyl)-N'-ethylthiourea.

EXAMPLE 3

*N-(benzenesulfonyl)-N'-butylcarbodiimide*

To 10.88 g. (0.04 mole) of N-benzenesulfonyl-N'-butylthiourea in 20 ml. of chlorobenzene was added 3.9 g. (0.04 mole) of phosgene in 40 ml. of dry chlorobenzene dropwise with stirring and cooling over a period of 11 minutes at 3° C. After stirring for 70 minutes at temperatures between 25–28° C., the reaction mixture was refluxed for 80 minutes at 130–132° C. while nitrogen was passed through for the first 30 minutes. A small amount of solid material was removed by filtration and evaporation of the solvent afforded 8.9 g. of crude product. Distillation under reduced pressure produced 3.8 g. (40 percent) of N - benzenesulfonyl - N'-butylcarbodiimide, B.P. 151–155° C. (0.1 mm.).

*Analysis.*—Calcd. for $C_{11}H_{14}N_2O_2S$: C, 55.45; H, 5.92; N, 11.75. Found: C, 55.51; H, 5.89; N, 11.70.

In the same manner as shown above, N-benzenesulfonyl - N' - cyclopentylcarbodiimide, N-benzenesulfonyl-N' - cyclohexylcarbodiimide, N - benzenesulfonyl - N'-cycloheptylcarbodiimide, and N-benzenesulfonyl-N'-cyclooctylcarbodiimide are prepared by substituting N-benzenesulfonyl - N' - cyclopentylthiourea, N - benzenesulfonyl-N' - cyclohexylthiourea, N - benzenesulfonyl - N'-cycloheptylthiourea and N - benzenesulfonyl - N'-cyclooctylthiourea, respectively, for N - benzenesulfonyl - N'-butylthiourea.

EXAMPLE 4

*N-(4-methylbenzenesulfonyl)-N'-butylcarbodiimide*

To 13.44 g. (0.047 mole) of N-(4-methylbenzenesulfonyl)-N'-butylthiourea in 94 ml. of dry chlorobenzene was added 4.7 g. (0.047 mole) of phosgene in 40 ml. of dry chlorobenzene dropwise with stirring and ice cooling over a period of 11 minutes at 4° C. After stirring for 10 minutes at about 40° C., nitrogen was passed through the reaction mixture and the mixture was refluxed for 70 minutes at 130–132° C. Evaporation of the chlorobenzene gave 12.3 g. of crude product. Distillation under reduced pressure produced 5.6 g. (47.3 percent) of N-(4-methylbenzenesulfonyl)-N'-butylcarbodiimide, B.P. 159–162° C. (0.2 mm.).

*Analysis.*—Calcd. for $C_{12}H_{16}N_2O_2S$: C, 57.12; H, 6.38; N, 11.10; S, 12.70. Found: C, 56.36; H, 6.36; N, 11.05; S, 13.17.

In the same manner as shown above,

N-(4-methylbenzenesulfonyl)-N'-cyclopentylcarbodiimide,
N-(4-methylbenzenesulfonyl)-N'-cyclohexylcarbodiimide,
N-(4-methylbenzenesulfonyl)-N'-cycloheptylcarbodiimide,
N-(4-methylbenzenesulfonyl)-N'-cyclooctylcarbodiimide,
N-(4-ethylbenzenesulfonyl)-N'-cyclohexylcarbodiimide,
N-(4-propylbenzenesulfonyl)-N'-cycloheptylcarbodiimide, and
N-(3-butylbenzenesulfonyl)-N'-cyclooctylcarbodiimide are prepared by substituting N-(4-methylbenzenesulfonyl)-N'-cyclopentylthiourea,
N-(4-methylbenzenesulfonyl)-N'-cyclohexylthiourea,
N-(4-methylbenzenesulfonyl)-N'-cycloheptylthiourea,
N-(4-methylbenzenesulfonyl)-N'-cyclooctylthiourea,
N-(4-ethylbenzenesulfonyl)-N'-cyclohexylthiourea,
N-(4-propylbenzenesulfonyl)-N'-cycloheptylthiourea, and
N-(3-butylbenzenesulfonyl)-N'-cyclooctylthiourea, respectively, for N - (4-methylbenzenesulfonyl)-N'-butylthiourea.

EXAMPLE 5

*N-(4-methylbenzenesulfonyl)-N'-butylcarbodiimide*

To 11.54 g. (0.04 mole) of N-(4-methylbenzenesulfonyl)-N'-butylthiourea suspended in 120 ml. of carbon tetrachloride was added 8.32 g. (0.04 mole) of phosphorus pentachloride. On heating at 35° C. evolution of hydrogen chloride was observed and the phosphorus pentachloride was consumed within 15 minutes (temperature 35–47° C.). The reaction mixture was refluxed at 77–78° C. for five hours and on evaporation of the solvent and distillation under reduced pressure produced 7.7 g. (75.5 percent) of N - (4-methylbenzenesulfonyl)-N'-butylcarbodiimide, B.P. 185–186° C. (1.3 mm.).

In the same manner as shown above,
N-(3,4-dimethylbenzenesulfonyl)-N'-butylcarbodiimide,
N-(3-chloro-4-methylbenzenesulfonyl)-N'-propylcarbodiimide,
N-(3-ethyl-4-ethoxybenzenesulfonyl)-N'-propylcarbodiimide, and
N-(3-chloro-4-methoxybenzenesulfonyl)-N'-piperidinocarbodiimide are prepared by substituting
N-(3,4-dimethylbenzenesulfonyl)-N'-butylthiourea,
N-(3-chloro-4-methylbenzenesulfonyl)-N'-propylthiourea,
N-(3-ethyl-4-ethoxybenzenesulfonyl)-N'-propylthiourea, and
N-(3-chloro-4-methoxybenzenesulfonyl)-N'-piperdinothiourea for
N-(4-methylbenzenesulfonyl)-N'-butylthiourea.

EXAMPLE 6

*N-(4-methylbenzenesulfonyl)-N'-butylcarbodiimide*

To 11.54 g. (0.04 mole) of N-(4-methylbenzenesulfonyl)-N'-butylthiourea in 90 ml. of dry chlorobenzene was added 4.76 g. (0.04 mole) of thionyl chloride dropwise with cooling and stirring over a period of 3 minutes at 5–8° C. After stirring for 100 minutes at 25° C., the reaction mixture was refluxed for 90 minutes at 132–133° C. Evaporation of the chlorobenzene and distillation under reduced pressure produced 1.2 g. (11.9 percent) of N - (4-methylbenzenesulfonyl)-N'-butylcarbodiimide, B.P. 157–166° C. (0.3 mm.).

EXAMPLE 7

*N-(4-methylbenzenesulfonyl)-N'-hexamethyleneiminocarbodiimide*

In the same manner as shown in Example 1,
N-(4-methylbenzenesulfonyl)-N'-hexamethyleneiminocarbodiimide was prepared by substituting
N-(4-methylbenzenesulfonyl)-N'-hexamethyleneiminothiourea for N-benzenesulfonyl-N'-ethylthiourea.
Similarly,
N-(4-methylbenzenesulfonyl)-N'-piperidinocarbodiimide,
N-(4-methylbenzenesulfonyl)-N'-(4-methylpiperidino)carbodiimide, and
N-(4-methylbenzenesulfonyl)-N'-(4,4-dimethylpiperidino)carbodiimide are prepared by substituting
N-(4-methylbenzenesulfonyl)-N'-piperidinothiourea,
N-(4-methylbenzenesulfonyl)-N'-(4-methylpiperidino)thiourea and
N-(4-methylbenzenesulfonyl)-N'-(4,4-dimethylpiperidino)thiourea, respectively, for
N-benbenesulfonyl-N'-ethylthiourea in Example 1.

EXAMPLE 8

*N-(4-chlorobenzenesulfonyl)-N'-propylcarbodiimide*

In the same manner as shown in Example 1, N-(4-chlorobenzenesulfonyl)-N'-propylcarbodiimide was prepared by substituting N-(4-chlorobenzenesulfonyl)-N'-propylthiourea for N-benzenesulfonyl-N'-ethylthiourea.
Similarly,
N-(4-chlorobenzenesulfonyl)-N'-cycloheptylcarbodiimide,
N-(4-bromobenzenesulfonyl)-N'-cycloheptylcarbodiimide,
N-(4-chlorobenzenesulfonyl)-N'-butylcarbodiimide,
N-(4-chlorobenzenesulfonyl)-N'-methylcarbodiimide,
N-(4-bromobenzenesulfonyl)-N'-butylcarbodiimide,
N-(3-chlorobenzenesulfonyl)-N'-butylcarbodiimide,
N-(4-chlorobenzenesulfonyl)-N'-hexamethyleneiminocarbodiimide, and
N-(4-chlorobenzenesulfonyl)-N'-piperidinocarbodiimide
are prepared by substituting
N-(chlorobenzenesulfonyl)-N'-cycloheptylthiourea,
N-(4-bromobenzenesulfonyl)-N'-cycloheptylthiourea,
N-(4-chlorobenzenesulfonyl)-N'-butylthiourea,
N-(4-chlorobenzenesulfonyl)-N'-methylthiourea,
N-(4-bromobenzenesulfonyl)-N'-butylthiourea,
N-(3-chlorobenzenesulfonyl)-N'-butylthiourea,
N-(4-chlorobenzenesulfonyl)-N'-hexamethyleneiminothiourea, and
N-(4-chlorobenzenesulfonyl)-N'-piperidinothiourea,
respectively, for
N-benzenesulfonyl-N'-ethylthiourea in Example 1.

EXAMPLE 9

*N-(4-methoxybenzenesulfonyl)-N'-cyclohexylcarbodiimide*

In the same maner as shown in Example 1,
N-(4-methoxybenzenesulfonyl)-N'-cyclohevylcarbodiimide was prepared by substituting
N-(4-methoxybenzenesulfonyl)-N'-cyclohexylthiourea for N-benzenesulfonyl-N'-ethylthiourea.
Similarly,
N-(4-methoxybenzenesulfonyl)-N'-butylcarbodiimide,
N-(4-methoxybenzenesulfonyl)-N'-methylcarbodiimide,
N-(3-methoxybenzenesulfonyl)-N'-propylcarbodiimide,
N-(4-ethoxybenzenesulfonyl)-N'-butylcarbodiimide,
N-(3,4-dimethoxybenzenesulfonyl)-N'-pentylcarbodiimide,
N-(4-propoxybenzenesulfonyl)-N'-isobutylcarbodiimide,
N-(4-methoxybenzenesulfonyl)-N'-hexamethyleneiminocarbodiimide,
N-(4-butoxybenzenesulfonyl)-N'-ethylcarbodiimide, and
N-(4-methoxybenzenesulfonyl)-N'-piperidinocarbodiimide are prepared by substituting
N-(4-methoxybenzenesulfonyl)-N'-butylthiourea,
N-(4-methoxybenzenesulfonyl)-N'-methylthiourea,
N-(3-methoxybenzenesulfonyl)-N'-propylthiourea,
N-(4-ethoxybenzenesulfonyl)-N'-butylthiourea,
N-(3,4-dimethoxybenzenesulfonyl)-N'-pentylthiourea,
N-(4-propoxybenzenesulfonyl-N'-isobutylthiourea,
N-(4-methoxybenzenesulfonyl)-N'-hexamethyleneiminothiourea,
N-(4-butoxybenzenesulfonyl)-N'-ethylthiourea, and
N-(4-methoxybenzenesulfonyl)-N'-piperidinothiourea,
respectively, for
N-benzenesulfonyl-N'-ethylthiourea in Example 1.

EXAMPLE 10

*N-(4-acetylbenzenesulfonyl)-N'-cyclohexylcarbodiimide*

In the same manner as shown in Example 1,
N-(4-acetylbenzenesulfonyl)-N'-cyclohexylcarbodiimide was prepared by substituting
N-(4-acetylbenzenesulfonyl)-N'-cyclohexylthiourea for
N-benzenesulfonyl-N'-ethylthiourea.

Similarly,
N-(4-acetylbenzenesulfonyl)-N'-hexamethyleneiminocarbodiimide,
N-(4-propionylbenzenesulfonyl)-N'-piperidinocarbodiimide,
N-(3-butyrylbenzenesulfonyl)-N'-propylcarbodiimide,
N-(4-acetylbenzenesulfonyl)-N'-butylcarbodiimide,
N-(4-acetylbenzenesulfonyl)-N'-methylcarbodiimide,
N-(4-acetylbenzenesulfonyl)-N'-cycloheptylcarbodiimide and
N-(4-acetylbenzenesulfonyl)-N'-cyclooctylcarbodiimide
are prepared by substituting
N-(4-acetylbenzenesulfonyl)-N'-hexamethyleneiminothiourea,
N-(4-propionylbenzenesulfonyl)-N'-piperidinothiourea,
N-(3-butyrylbenzenesulfonyl)-N'-propylthiourea,
N-(4-acetylbenzenesulfonyl)-N'-butylthiourea,
N-(4-acethylbenzenesulfonyl)-N'-methylthiourea,
N-(4-acethylbenzenesulfonyl)-N'-cycloheptylthiourea, and
N-(4-acetylbenzenesulfonyl)-N'-cyclooctylthiourea,
respectively, for
N-benzenesulfonyl-N'-ethylthiourea in Example 1.

EXAMPLE 11

*N-methylsulfonyl-N'-n-propylcarbodiimide*

To 12.7 g. (0.065 mole) of N-methylsulfonyl-N'-n-propylthiourea in 87 ml. of dry chlorobenzene was added 6.5 g. (0.065 mole) of phosgene in 40 ml. of dry chlorobenzene with cooling and stirring over a period of 17 minutes at 3–4° C. After stirring for 30 minutes while the temperature was allowed to come to 20° C., the reaction mixture was refluxed for 30 minutes at 130° C. with nitrogen passing through the reaction mixture to remove traces of phosgene. Evaporation of the chlorobenzene afforded 11 g. of crude product which was distilled under reduced pressure to afford 7.7 g. (73.3% of N-methylsulfonyl-N'-n-propylcarbodiimide, B.P. 93° C. (0.25 mm.).

*Analysis.*—Calcd. for $C_5H_{10}N_2O_2S$: C, 37.02; H, 6.21; N, 17.26. Found: C, 37.58; H, 6.30; N, 17.37.

In the same manner as shown above,
N-ethylsulfonyl-N'-methylcarbodiimide,
N-propylsulfonyl-N'-propylcarbodiimide,
N-butylsulfonyl-N'-butylcarbodiimide,
N-pentylsulfonyl-N'-ethylcarbodiimide,
N-hexylsulfonyl-N'-hexylcarbodiimide
are prepared by substituting
N-ethylsulfonyl-N'-methylthiourea,
N-propulsulfonyl-N'-propylthiourea,
N-buthylsulfonyl-N'-buylthiourea,
N-pentylsulfonyl-N'-ethylthiourea and
N-hexylsulfonyl-N'-hexylthiouera for
N-methylsulfonyl-N'-n-propylthiourea.

EXAMPLE 12

*N-methylsulfonyl-N'-n-butylcarbodiimide*

To 10.5 g. (0.05 mole) of N-methylsulfonyl-N'-n-butylthiourea in 65 ml. of dry chlorobenzene was added 5 g. (0.05 mole) of phosgene in 40 ml. of dry chlorobenzene with stirring over a period of 17 minutes at 5° C. After stirring for one hour at a temperature of about 25° C., the reaction mixture was refluxed at 130° C. for 30 minutes with nitrogen passing through to remove unreacted phosgene. Evaporation of the chlorobenzene afforded 9.6 g. of crude product which upon distillation under reduced pressure gave 7 g. (79.5%) of N-methylsulfonyl-N'-n-butylcarbodiimide, B.P. 103–105° C. (0.3 mm.).

*Analysis.*—Calcd. for $C_6H_{12}N_2O_2S$: C, 40.89; H, 6.86; N, 15.90. Found: C, 41.17; H, 6.77; N, 16.12.

In the same manner as shown above, N-methylsulfonyl-N' - cyclopentylcarbodiimide, N - ethylsulfonyl - N'-cyclo- heptylcarbodiimide, N-propylsulfonyl - N' - piperidinocarbodiimide, N - butylsulfonyl - N'-hexamethyleneiminocarbodiimide and N - hexylsulfonyl - N' - (4,4-dimethylpiperidino)carbodiimide are prepared by substituting N-methylsulfonyl-N'-cyclopentylthiourea, N-ethylsulfonyl-N'-cycloheptylthiourea, N - propylsulfonyl - N'-piperidinothiourea, N - butylsulfonyl - N'-hexamethyleneiminothiourea and N-hexylsulfonyl-N'-(4,4-dimethylpiperidino)thiourea for N-methylsulfonyl-N'-n-butylthiourea.

The novel sulfonylcarbodiimides of the present invention are useful as stabilizers for polyesters. Polyesters tend to deteriorate under heat and high humidity conditions as well as simple aging of the product. The elasticity and tear resistance of these products is then reduced considerably. It has been found that carbodiimides are generally useful as stabilizers to protect the polyesters against these undesirable characteristics (German Patent 1,005,726; Belgium Patents 612,040 and 618,389). Now it has been found that the novel sulfonylcarbodiimides of the present invention possess this stabilizing effect to a greater degree than the carbodiimides. The use of the sulfonylcarbodiimides for this purpose is particularly attractive since the sulfonylcarbodiimides are less susceptible to side reactions than the carbodiimides and thus can be used more effectively. In addition, the sulfonylcarbodiimides are colorless and less susceptible to discoloration than the carbodiimides.

Polyesters which can be effectively stabilized utilizing the sulfonylcarbodiimides of the present invention include polyesters having the ester groups in the chain as well as polyesters having the ester groups pendant to the polymer chain.

Polyesters having the ester groups in the chain include, e.g., (a) Polyester polyurethanes derived by reacting at least one diol with at least one dicarboxylic acid under such conditions as to produce an essentially linear polyester diol having a molecular weight from about 500 to 5,000, preferably from about 1,000 to 3,000. In the preparation of the polyester, small amounts of reactants having a functionality greater than two can be tolerated but should not be present in amounts to produce substantial branching. The diol and the acid may or may not contain olefinic bonds. The polyester is then reacted with a diisocyanate to produce a polyester polyurethane (Saunders and Frisch, Polyurethanes, Chemistry and Technology, Interscience, New York, 1961, pp. 44, 45, 313, 314, 315, 323 and 324; Bjorksten, Polyesters and Their Applications, Reinhold, 1960, pp. 225–232, inclusive; Bayer Rubber Chemistry and Technology, 23, 1950, 812; U.S. Patents 2,625,531 and 2,625,532).

(b) Polyester polyurethanes derived by polymerization of lactones, more particularly epsilon caprolactones, which polymerization is initiated by a suitable bifunctional initiator, such as a diol or amino alcohol to obtain a polyester diol which is then reacted with a polyisocyanate (U.S. Patents 2,933,477 and 2,933,478).

(c) Linear fiber forming polyesters such as polyethylene terephthalate and elastomeric terephthalates, the latter based on use of a mixture of an aliphatic acid with the terephthalic acid (Bjorksten, supra).

(d) Polyesters, usually unsaturated, cross-linked to a solid three dimensional network by a vinyl monomer, such as poly(ethylene maleate) diol having a molecular weight of about 2,000, mixed with styrene to form a liquid which is caused to polymerize to a solid resin by heating in the presence of benzoyl peroxide. Similar materials are used in combination with glass fibers to produce useful plastic materials (Bjorksten, supra, pp. 21–94, and Schildknecht Vinyl and Related Polymers, John Wiley and Sons, Inc., New York, 1952, pp. 75–81).

Polyesters having the ester groups pendant to the polymer chain include, e.g., (a) Polymers of vinyl esters of carboxylic acids and copolymers of these vinyl esters with at least one other vinyl monomer; a specific example of this is vinyl acetate and copolymers of vinyl acetate and ethylene (Schildknecht, supra, pp. 323–385 and 531–533, inclusive).

(b) Plastic and elastomeric high polymers of alpha, beta unsaturated carboxylic acid esters and copolymers thereof with at least one other vinyl monomer; a specific example of this is poly(methylmethacrylate) and poly(methylacrylate) as plastics and copolymers of methyl acrylate and butadiene as rubbers (Schildknecht, supra, pp. 179–255).

In utilizing the sulfonylcarbodiimides as stabilizing agents, it has been particularly advantageous to intimately mix from 0.5% to 5% by weight of the sulfonylcarbodiimide with the polyester. When the final polyester is crosslinked, it has also been found to be advantageous to add the sulfonylcarbodiimide prior to the cross-linking.

EXAMPLE 507 grams (1 equivalent) of hydroxyl polyethylene adipate, molecular weight 1014, hydroxyl number 110, and acid number 0.28, was melted in a one liter resin flask and was stirred for 4 to 5 hours at a pressure of 3 to 4 mm. at 100° to 120° C. The mixture was cooled to 75° C. and 88 grams (0.667 equivalent) of o-tolidine diisocyanate was added. The mixture was then heated to 100° C. and maintained at said temperature for one hour. 123 grams of additional diisocyanate (0.934 equivalent) was then added and the melt was heated to 100° C. and maintained at this temperature for one hour. The resulting prepolymer had a melting point of 30° to 35° C. and a viscosity of 13,000 cps. at 100° C. and an equivalent weight by titration with di-n-butylamine of 1197.

One hundred grams of the polymer was heated to 125° C. and evacuated in a dessicator at 2 to 3 mm. for ten minutes to remove entrapped air. The polymer was then cooled to 110° C. and 3.5 grams of 1.4 butanediol (90% of required stoichiometric amount) was added together with 4 grams of N-methylsulfonyl-N'-n-propylcarbodiimide, mixed well for five minutes and poured into a well greased tray. The tray was covered and heated for three hours at 100° C. The product was an elastomeric polyurethane melting at about 150° C.

The product was subjected to 95% relative humidity atmosphere at 70° C. for seven days after which time it was noted that the retention of tensile strength was markedly greater than that of a sample which was the same except that it contained none of the N-methylsulfonyl-N'-propylcarbodiimide.

Some of the sulfonylcarbodiimides of the present invention are valuable medicaments and, more particularly, are suitable as the active ingredient in blood sugar reducing compositions, more particularly, in unit dosage compositions for the treatment of blood sugar disorders of animals, particularly human diabetes. The blood sugar reducing activities of compounds such as N-(4-methylbenzenesulfonyl)-N'-butylurea, N-(4-chlorobenzenesulfonyl)-N'-propylurea, N-(4-aminobenzenesulfonyl)-N'-butylurea are well known. It has now been unexpectedly discovered that sulfonylcarbodiimides of the present invention having the formula:

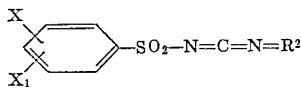

wherein X and $X_1$ have the values represented above and $R^2$ represents alkyl of two to six carbon atoms, inclusive, e.g., ethyl, propyl, isopropyl, isobutyl, butyl, hexyl, and the like, cycloalkyl of five to eight carbon atoms, inclusive, e.g., cyclopentyl, cyclohexyl, cycloheptyl, cyclooctyl, and the like, and

which represents a saturated heterocyclic amino selected from the group consisting of unsubstituted and mono- and polyalkyl substituted piperidino and hexamethyleneimino wherein each alkyl is of one to four carbon atoms, inclusive also possess such desirable properties. Representative saturated heterocyclic amino radicals include, e.g., piperidino, hexamethyleneimino, 2-methylpiperidino, 3-methylpiperidino, 4-methylpiperidino, 2-butylpiperidino, 2-propylpiperidino, 4-isopropylpiperidino, 3,4-diethylpiperidino, and the like. For the treatment of diabetes, these compounds are useful perorally and for this purpose the active compounds are used alone or admixed with a pharmaceutically acceptable carrier.

For such oral administration, the active compounds can be administered in liquid or solid dosage forms. Solid forms include capsules, tablets, powders, granules, pills, soluble elastic capsules or suitably sealed hard gelatin or methylcellulose capsules, and the like. Liquid forms include nonaqueous dispersions such as in glycols (propylene glycol, lower molecular weight polyethylene glycols, etc.) and edible oils, mixtures of these, and the like, and oil suspensions and solutions in edible oils such as corn oil, cottonseed oil, coconut oil, peanut oil, sesame oil, or mixtures of these, and the like. Dispersions in other nontoxic pharmaceutically acceptable liquid vehicles such as glycerol, sorbitol, and the like, or combinations of these liquid vehicles can also be employed. Suitable flavors, preservatives, dispersing agents and stabilizers can also be added.

For preparing compositions such as tablets and other compressed formulations, the compositions can include any compatible and edible tableting material used in pharmaceutical practice such as corn starch, lactose, dicalcium phosphate, stearic acid, magnesium stearate, talc, methyl cellulose, as well as natural and synthetic gums, and the like.

Similarly, the compounds of the present invention can be mixed with suitable adjuvants for the preparation of resorbable hard or soft gelatin or methylcellulose capsules utilizing conventional pharmaceutical practices. To improve blood level, surfactants such as polysorbate 80 and dioctyl sodium sulfosuccinate can be added. The hard capsules are advantageously hermetically sealed against leakage and moisture from the air.

The optimum dosage of the novel compounds of the present invention for the treatment of diabetes depends on the age, weight, and condition of the patient being treated. Generally speaking, for human oral administration, the preferred unit dosage is 15 to 500 mg. of active compound alone or admixed with a pharmaceutical diluent. One or two unit dosages are given one to four times a day. A total daily dose of from 60 to 4000 mg. given in a single dose, or preferably in divided doses, embraces the effective range of the treatment of diabetes.

The following compositions are within the scope of the present invention.

(1) Hard capsules 10,000 two-piece hard methylcellulose capsules for oral use, each containing 500 mg. of N-(4-methylbenzenesulfonyl)-N'-butylcarbodiimide and 25 mg. polysorbate 80 were prepared from the following amounts and types of materials:

| | Gm. |
|---|---|
| N - (4 - methylbenzenesulfonyl) - N' - butylcarbodiimide | 5000 |
| Polysorbate 80 | 250 |
| Corn starch | 1616 |
| Mineral oil, U.S.P. | 129.6 |
| Magnesium stearate, powder | 162 |
| Talc, U.S.P. | 162 |

The N - (4 - methylbenzenesulfonyl) - N' - butylcarbodiimide was mixed thoroughly with the rest of the ingredients and then capsulated.

In the same manner 10,000 two-piece hard gelatin capsules containing 100 mg. of N-(4-methylbenzenesulfonyl)-N'-cycloheptylcarbodiimide were prepared by substituting 1000 g. of N-(4-methylbenzenesulfonyl)-N'-cycloheptylcarbodiimide for N-(4-methylbenzenesulfonyl)-N'-butylcarbodiimide.

(2) Soft elastic capsules

One-piece soft elastic capsules for oral use, each containing 35 mg. of N-(4-bromobenzenesulfonyl)-N'-cycloheptylcarbodiimide were prepared according to accepted pharmaceutical practice by first dispersing the active material in sufficient polyethylene glycol 400 to render the material capsulatable.

Similarly, one-piece soft elastic capsules each containing 60 mg. of N-(4-chlorobenzenesulfonyl)-N'-propylcarbodiimide were prepared.

(3) Oil suspension

An oil suspension for oral use, each 5 ml. containing 250 mg. of N-(4-methoxybenzenesulfonyl-N'-butylcarbodiimide, was prepared from the following types and amounts of materials:

| | | |
|---|---|---|
| Saccharin sodium | gm | 10 |
| Cyclamate sodium (sodium cyclohexylsulfamate | gm | 2.5 |
| N-(4-methoxybenzene sulfonyl)-N'-butylcarbodiimide | gm | 500 |
| Benzoic acid, powder | gm | 10 |
| Methylparaben | gm | 10 |
| Butylated hydroxyanisole | gm | 1 |
| Oil of orange | ml | 25 |
| Aluminum monostearate-corn oil gel, ml. | | To make 10,000 |

In the same manner, an oil suspension containing 100 mg. of N-(4-methylbenzenesulfonyl)-N'-cyclohexylcarbodiimide in each 5 ml. of suspension was prepared by substituting 200 g. of N-(4-methylbenzenesulfonyl)-N'-cyclohexylcarbodiimide for N-(4-methoxybenzenesulfonyl)-N'-butylcarbodiimide.

Similarly, an oil suspension containing 100 mg. of N-(4-chrolobenzenesulfonyl)-N'-cycloheptylcarbodiimide in each 5 ml. of suspension was prepared by substituting N-(4-chlorobenzenesulfonyl)-N'-cycloheptylcarbodiimide for N-(4-methoxybenzenesulfonyl)-N'-butylcarbodiimide.

Adult dose is one or two teaspoonfuls (5–10 ml.), one to three times a day.

(4) Tablet 10,000 oral tablets each containing 100 mg. of N-(4-bromobenzenesulfonyl)-N'-cycloheptylcarbodiimide were prepared from the following types and amounts of materials:

| | Gm. |
|---|---|
| N-(4-bromobenzenesulfonyl)-N'-cycloheptylcarbodiimide | 1000 |
| Dicalcium phosphate | 3050 |
| Starch | 65 |
| Talc, bolted | 450 |
| Calcium stearate, fine powder | 35 |

The finely powdered N-(4-bromobenzenesulfonyl)-N'-cycloheptylcarbodiimide, dicalcium phosphate, starch, talc and calcium stearate were mixed well and slugged. The slugs were forced through a No. 8 screen and the granules slugged again. These were forced through a No. 12 screen and the resulting granules compressed into tablets containing 100 mg. of the active material per tablet.

In the same manner, 10,000 tablets of N-(4-methylbenzenesulfonyl)-N'-butylcarbodiimide were prepared, containing 500 mg. of active ingredient per tablet, by substituting 5000 g. of N-(4-methylbenzenesulfonyl)-N'-butylcarbodiimide for N-(4-bromobenzenesulfonyl)-N'-cycloheptylcarbodiimide.

Also, 10,000 tablets of N-(4-chlorobenzenesulfonyl)-N'-propylcarbodiimide were prepared, containing 200 mg. of active ingredient per tablet, by substituting 2000 g. of N-(4-chlorobenzenesulfonyl)-N'-propylcarbodiimide for N-(4-bromobenzenesulfonyl)-N'-cycloheptylcarbodiimide.

(5) Soft elastic capsules

One-piece soft elastic capsules for oral use, each containing 500 mg. of N-(4-methylbenzenesulfonyl)-N'-butylcarbodiimide liquid were prepared directly without prior dilution.

Similarly, one-piece soft elastic capsules containing 150 mg. of N-(4-methylbenzenesulfonyl)-N'-cycloheptylcarbodiimide or 100 mg. of N-(4-methylbenzenesulfonyl)-N'-hexamethyleneiminocarbodiimide were prepared.

(6) Drop dosage form

A liquid concentrate for oral use, each ml. containing 100 mg. of N-(4-bromobenzenesulfonyl)-N'-cycloheptylcarbodiimide was prepared from the following materials:

| | | |
|---|---|---|
| Saccharin sodium | gm | 1 |
| Cyclamate sodium | gm | 10 |
| N-(4-bromobenzenesulfonyl)-N'-cycloheptylcarbodiimide | gm | 100 |
| Oil of peppermint | ml | 2.5 |
| Polyethylene glycol 400 | To make 1000 ml. | |

In the same manner, a liquid concentrate containing 500 mg. of N-(4-methylbenzenesulfonyl)-N'-butylcarbodiimide in each ml. was prepared by substituting 500 g. of N-(4-methylbenzenesulfonyl)-N'-butylcarbodiimide for N-(4-bromobenzenesulfonyl)-N'-cycloheptylcarbodiimide.

Also, a liquid concentrate containing 200 mg. of N-(4-chlorobenzenesulfonyl)-N'-propylcarbodiimide in each ml. was prepared by substituting 200 g. of N-(4-chlorobenzenesulfonyl)-N'-propylcarbodiimide for N-(4-bromobenzenesulfonyl)-N'-cycloheptylcarbodiimide.

We claim:

1. A compound of the formula $$R^1\text{---}SO_2\text{---}N\text{=}C\text{=}N\text{---}R$$

wherein $R^1$ is selected from the group consisting of alkyl from 1 to 6 carbon atoms, R is selected from the group consisting of alkyl of one to six carbon atoms, inclusive, cycloalkyl of five to eight carbon atoms, inclusive, and

which is selected from the group consisting of unsubstituted mono- and polyalkyl substituted piperidino and hexamethyleneimino wherein each alkyl is of one to four carbon atoms, inclusive.

2. N-methylsulfonyl-N'-n-propylcarbodiimide.
3. N-methylsulfonyl-N'-n-butylcarbodiimide.
4. A process for the preparation of sulfonylcarbodiimides having the formula:

$$R^1\text{---}SO_2\text{---}N\text{=}C\text{=}N\text{---}R$$

wherein $R^1$ is selected from the group consisting of alkyl from one to six carbon atoms, inclusive, and

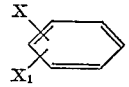

wherein X and $X_1$ are selected from the group consisting of hydrogen, alkyl of one to four carbon atoms, inclusive, alkoxy of one to four carbon atoms, inclusive, halogen, and alkanoyl of two to four carbon atoms, inclusive, R is selected from the group consisting of alkyl of one to six carbon atoms, inclusive, cycloalkyl of five to eight carbon atoms, inclusive, and

which is selected from the group consisting of unsubstituted mono- and polyalkyl substituted piperidino and hexamethyleneimino wherein each alkyl is of one to four carbon atoms, inclusive, which comprises the steps of mixing a sulfonylthiourea having the formula:

wherein $R^1$ and R have the above values, and an acid halide under substantially anhydrous conditions and in the absence of a substantial amount of an acid acceptor, reacting the produced mixture at a temperature of between about zero and about 60° C., and then heating the obtained reaction mixture of reactants and reaction products to between about 75° C. and about 200° C.

5. A process for the preparation of N-(4-methylbenzenesulfonyl)-N'-butylcarbodiimide which comprises the steps of mixing N-(4-methylbenzenesulfonyl)-N'-butylthiourea and an acid halide selected from the group consisting of phosgene, phosphorus pentabromide, phosphorus trichloride, phosphorus tribromide, and thionyl chloride under substantially anhydrous conditions and in the absence of a substantial amount of an acid acceptor, reacting the produced mixture at a temperature of between about 15° C. and about 50° C., and then heating the obtained mixture of reactants and reaction products to a temperature of between about 75° C. and about 150° C.

References Cited
UNITED STATES PATENTS

| | | | |
|---|---|---|---|
| 2,907,692 | 10/1959 | Haack et al. | 260—553 |
| 2,964,560 | 12/1960 | Haack et al. | 260—553 |
| 2,968,158 | 1/1961 | Ruschig et al. | 167—55 |
| 2,975,212 | 3/1961 | Wagner et al. | 260—553 |
| 2,976,317 | 3/1961 | Ruschig et al. | 260—553 |
| 3,097,240 | 9/1963 | Aummuller et al. | 260—553 |
| 3,097,241 | 9/1963 | Korger et al. | 260—553 |
| 3,135,748 | 6/1964 | Sheehan | 260—551 |
| 3,169,138 | 2/1965 | Aummuller et al. | 260—556 |
| 3,183,266 | 5/1965 | Matzner | 260—556 |
| 3,236,882 | 2/1966 | Wilson. | |

FOREIGN PATENTS

| | | |
|---|---|---|
| 900,968 | 7/1962 | Great Britain. |

JOHN D. RANDOLPH, *Primary Examiner.*

UNITED STATES PATENT OFFICE
CERTIFICATE OF CORRECTION

Patent No. 3,388,159                                  June 11, 1968

Adnan A. R. Sayigh et al.

It is certified that error appears in the above identified patent and that said Letters Patent are hereby corrected as shown below:

Column 2, line 64, "unually" should read -- usually --. Column 3, line 5, "mixtxure" should read -- mixture --. Column 5, line 75, "benbenesulfonyl-" should read -- benzenesulfonyl- --. Column 6, line 21, "(chloro" should read -- (4-chloro --; line 37, "cyclohevylcarbo-" should read -- cyclohexylcarbo- --; line 59, "sulfonyl-N′" should read -- sulfonyl)-N′ --. Column 7, lines 18 and 19, "(4-acethylbenzene", each occurrence, should read -- (4-acetylbenzene --; line 50, "N-propulsulfonyl-" should read -- N-propylsulfonyl- --; line 51, "N-buthylsulfonyl-N′-buylthiourea," should read -- N-butylsulfonyl-N′-butylthiourea, --. Column 9, line 47, "N′-propyl" should read -- N′-n-propyl --. Column 10, line 71, "thorughly" should read -- thoroughly --. Column 14, after line 20, insert the following:

OTHER REFERENCES

Neidlein et al., Tetrahedon Letters, No. 2, pp. 149 to 153 (1965).

Signed and sealed this 25th day of November 1969.

(SEAL)
Attest:

EDWARD M. FLETCHER, JR.                        WILLIAM E. SCHUYLER, JR.
Attesting Officer                                      Commissioner of Patents